July 9, 1940.    F. A. VOLZ    2,207,277
COILABLE MEASURING DEVICE
Filed April 1, 1938
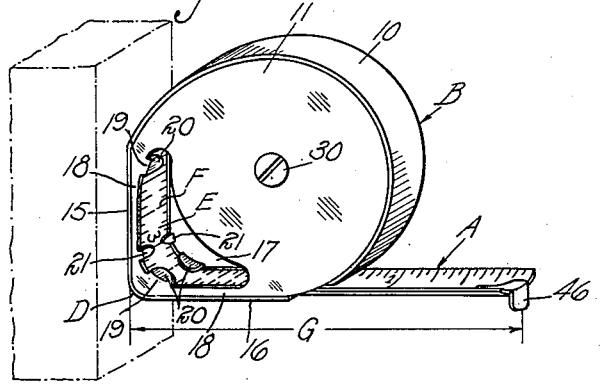
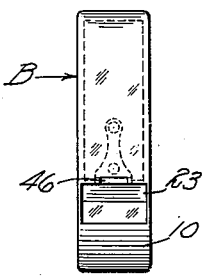
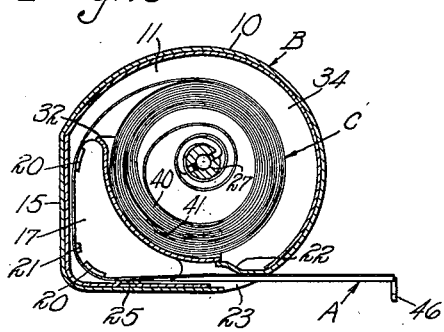
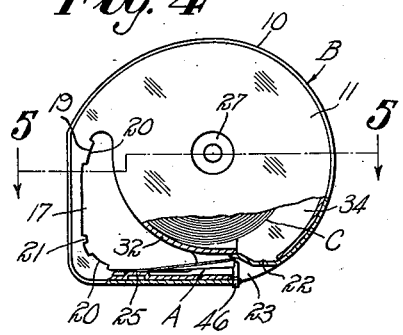
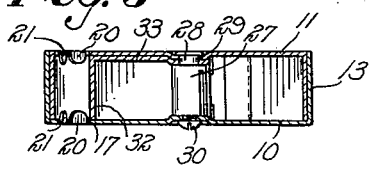
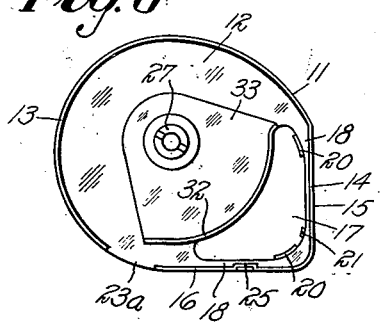
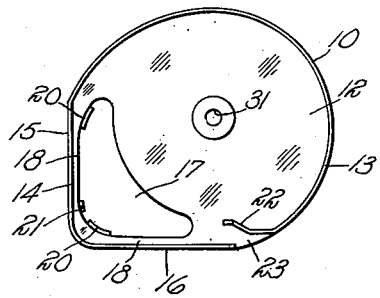
Inventor
FREDERICK A. VOLZ
By W. Clay Lindley.
Attorney Patented July 9, 1940

2,207,277

UNITED STATES PATENT OFFICE 2,207,277

COILABLE MEASURING DEVICE

Frederick A. Volz, New Britain, Conn., assignor to The Stanley Works, New Britain, Conn., a corporation of Connecticut Application April 1, 1938, Serial No. 199,364

4 Claims. (Cl. 33—137)

The present invention relates to coilable rules and particularly to a coilable rule of the outside wind push-pull type with which either inside or outside measurements may be taken with a single scale.

An object of the present invention is to provide a rule wherein there is provided a support within which the tape may be coilably wound, with each successive convolution overlying the preceding convolution, and so arranged that upon withdrawing the tape it is led from the coil in one direction and then curved and led in a direction generally perpendicular to the initial direction, with the surface of the tape exposed inside of the curve so that direct measurement readings may be taken on the inside curved surface of the tape.

Another object is to provide a rule having a support provided with an abutment wall adapted to be positioned adjacent a surface and a wall generally perpendicular to the abutment wall, with the tape led along the inner face of said abutment wall and then along the inner face of the wall generally perpendicular thereto; the support being so constructed as to expose the tape along said walls whereby an inside direct reading may be taken on the inside curved surface of the tape with the abutment wall positioned against an adjacent surface.

A still further object is to provide a support of this nature comprising casing members which are readily assembled and secured together and which may be economically manufactured and which is characterized by its simplicity of construction, lightness in weight, its compactness, and the ease and facility with which it may be employed.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawing:

Figure 1 is a perspective view of the rule showing it in position for taking an inside measurement;

Fig. 2 is a sectional view of the rule in the position shown in Fig. 1;

Fig. 3 is a bottom view of the rule;

Fig. 4 is a side view partly in section with the rule completely drawn into the casing;

Fig. 5 is a view on the line 5—5 of Fig. 4;

Fig. 6 is a side view of one member of the casing; and

Fig. 7 is a side view of the other member of the casing.

Referring to the drawing, the invention comprises, in general, a tape A, a support B in which the tape A is adapted to be externally wound into a coil C with each successive convolution overlying the preceding convolution; the support B having an angular portion D comprising a vertically extending flat abutment wall as viewed in Fig. 1 and a horizontally extending flat wall generally perpendicular thereto, the flat walls of the angular portion being provided with suitable lugs for guiding a portion E of the tape A along the inner faces of the flat walls thereof, said portion remaining uncoiled and in spaced radial relation to the coil C; to permit the reading of a scale F provided on the inner surface of the tape. There is further provided a distance index carried by the support and cooperating with the scale and so located as to compensate for curvature in the tape adjacent the intersection of the flat walls of the angular portion, so that the distance along the tape from the end thereof to the index is equal to the perpendicular distance G from the end thereof to the abutment wall of the angular portion.

In the particular embodiment shown, the support B comprises an outer casing member 10 and an inner casing member 11 adapted to telescope within the outer member 10. For economy in manufacture, the members may each comprise a one piece metal stamping having an irregular shaped side wall 12, which is substantially circular for three quadrants, and having an angular portion projecting from the fourth quadrant. Bent at right angles to the side walls 12 and co-extensive with the peripheral edge thereof is a peripheral wall 13; the outer surface of the vertical flat wall 14 of the angular portion thereof constitutes an abutment 15 adapted to be placed against a surface from which a measurement is to be taken, and the horizontal flat wall 16 of the angular portion being generally perpendicular to the vertical wall 14. The side wall 12 of each casing member is cut away to provide a substantially triangular opening 17 at a distance inwardly from the walls 14 and 16 to leave small marginal flanges 18 with prongs 19 extending outwardly therefrom, which prongs may be bent inwardly to serve as guide lugs 20 and index pointers 21 to guide the tape A along the inner surface of the walls 14 and 16. The peripheral wall 13 of member 10 is also cut to provide a lip 22 which is raised inwardly to provide an opening 23 through which the tape may be withdrawn. The peripheral wall of inner casing member 11 is also provided on the horizontal flat wall 16 thereof with a raised portion 25 for reasons hereinafter explained and also has an opening 23a cut therefrom which is alignable with opening 23 of member 10.

When the casing members are positioned one in the other, the angular portions thereof prevent relative turning movement, and when positioned the members are secured together by a post 27 adapted to receive a securing screw 30. The post 27 is provided with a reduced end portion 28 which projects through an opening 29 in the side wall of the casing member 11 and is peaned over the side wall to secure it thereto. Member 10 is then secured in place by screw 30 which extends through an opening 31 in the side wall thereof and is receivable in post 27. With the casing members so assembled, it will be seen that the tape coil C is receivable within the support between the circular portions of the side walls, whereas the flat walls 14 and 16, the marginal flanges 18, and guide lugs 20 form a guideway or passage to maintain a portion E of the tape uncoiled intermediate of the opening 23 and the outermost convolution of the coil C, whereby direct reading may be taken at the indexes 21 from the scale on the inside surface of the tape through the openings 17 in the side walls of the casing members.

In order to keep dirt and foreign matter out of the support, the casing member 11 may have a segmental peripheral wall 32 formed thereon; in the embodiment shown this wall being a separate member carried by a plate 33 secured to the casing member 11 by being held intermediate of the side wall 12 and the post 27. The wall 32 is positioned adjacent the inner edge of the triangular side opening 17 in the side wall members and extends circumferentially from the inner end of lip 22 to a point approximately in alignment with and spaced inwardly from the upper end of the vertical wall member 14 of the angular portion. With this construction, the support B comprises in effect an inner, substantially circular coil receiving chamber 34, through which the tape may be drawn into a continuous tape passage leading first in one direction along the inner surface of the vertical flat wall 14 and then generally perpendicular to the initial lead along the inner surface of the horizontal flat wall 16 to the opening 23; it being obvious that the chamber and angular portion could be constructed separately and secured together in any suitable way.

Although any type of tape could be used, the tape A shown herein is of the concavo-convex type having a natural tendency to assume a rectilinear state or rod-like form. The tape A is joined to a winding spring 40 at 41, and the winding spring 40 is joined to the post 37, the strength of the spring and the friction between the tape and the casing being such that a balanced effect will result. Preferably, the lugs 19 are so arranged on the flange 18 of the angular portion D that the curvature of the tape adjacent the intersection of the flat wall members is less than the natural curvature which the tape will assume when it is held at a point intermediate of its ends and allowed to fall to either side thereof. This reduction in curvature of the tape further assists in holding it in any withdrawn position.

The tape is further controlled by the bar 25 which tends to throw it upwardly against lip 22 so that when the tape is completely wound hook 46 is raised substantially within the casing and when the tape is withdrawn it is maintained against the flattened portion of lip 22.

With the rule so constructed, outside measurements may be taken in the usual way by withdrawing the tape A from the casing and measuring from the hook 46 along the straight portion of the tape. However, the rule is particularly suitable for taking inside measurements, and, in doing this, the abutment 15 may be placed against a wall (see Fig. 1) or other surface and the tape A withdrawn until the hook is against an opposite surface. The reading at the index fingers 21 on the uncoiled portion of the tape E within the support B will give a correct inside direct measurement as the distance along the tape from the hook 46 to the index pointers 21 is the same as the perpendicular distance from the hook 46 to the abutment 15. It is apparent that a reading may be readily taken from the uncoiled portion E with the abutment wall 15 positioned against the adjacent wall without removing the rule from its position. Furthermore, regardless of the angle at which the rule may be placed, the readings may readily be taken. Thus, if the rule were at right angles to the position shown in Fig. 1, the tape could readily be read through the opposed opening in the side wall of member 11.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a coilable measuring device, a tape having a scale on the inner face thereof, a support in which said tape is adapted to be externally wound into a coil, with each succeeding convolution overlying the preceding convolution, said support comprising a pair of members, each member having a side wall and a peripheral wall, the peripheral wall of one member being adapted to telescope within that of the other member, said peripheral walls having flat portions intersecting at substantially right angles at a point spaced radially from the outermost convolution of the coil, means for guiding said tape from said coil successively along the inner faces of said flat portions, an index carried by the first flat portion along which the tape is drawn and cooperating with the scale on the inner face of the tape and so positioned that the distance along the tape from the end thereof to the index is equal to the perpendicular distance from the end of the tape to the index carrying flat portion.

2. In a coilable measuring device, a tape having a scale on the inner face thereof, a support in which the tape is adapted to be externally wound into a coil with each succeeding convolution overlying the preceding convolution, said support having an angular portion radially spaced from the outermost convolution of the tape and having an abutment wall and a wall generally perpendicular to the abutment wall, means for guiding said tape from said coil successively along the inner faces of said walls, an index on said abutment wall cooperating with the inner face of said tape, the distance along the tape from the end thereof to the index being equal to the perpendicular distance from the end of the tape to said abutment.

3. In a coilable measuring device, a tape having a scale on the inner face thereof, a support in which the tape is adapted to be externally wound into a coil with each succeeding convolution overlying the preceding convolution, said support having a right angular portion radially spaced from the outermost convolution of the coil and having an abutment wall, means for guiding said tape from said coil successively along both inner faces of said right angular portion, an index on said abutment wall cooperating with the inner face of said tape, the distance along the tape from the end thereof to the index being equal to the perpendicular distance from the end of the tape to said abutment.

4. In a rule of the character described, a tape, a casing in which the tape is adapted to be wound into a coil, said casing having a flat abutment wall member and a second flat wall member extending from said first wall member and generally perpendicular thereto, means for guiding the tape successively along the inner surfaces of said abutment wall and said second wall members, the intersection of said wall members being spaced radially a distance from the outermost convolution of the coil to expose the inner face of the tape, an index on said flat wall abutment member cooperating with the inner face of said tape and so positioned that the distance from the end of said tape to said index is equal to the distance from the end of the tape to said flat abutment wall member.

FREDERICK A. VOLZ.